United States Patent
Toyoda et al.

Patent Number: 5,748,327
Date of Patent: May 5, 1998

[54] IMAGE COMMUNICATING APPARATUS WITH DIRECT SUPPLY OF POWER FROM A BATTERY TO VARIOUS UNITS

[75] Inventors: Hisashi Toyoda; Toshio Kenmochi; Yosuke Ezumi, all of Yokohama; Takeshi Tsukamoto, Kawasaki, all of Japan

[73] Assignee: Canon Kabushiki Kaisha, Tokyo, Japan

[21] Appl. No.: 824,330

[22] Filed: Mar. 26, 1997

Related U.S. Application Data

[63] Continuation of Ser. No. 150,985, Nov. 12, 1993, abandoned.

[30] Foreign Application Priority Data

Nov. 12, 1992 [JP] Japan .................................. 4-302542

[51] Int. Cl.[6] .............. H04N 1/00; H04N 1/024; G05F 1/46
[52] U.S. Cl. .................... 358/296; 358/400; 358/471; 323/265
[58] Field of Search ...................... 358/296, 400, 358/401, 471, 473, 474, 494, 496, 498; 323/234, 265, 299

[56] References Cited

U.S. PATENT DOCUMENTS

| | | | |
|---|---|---|---|
| 4,351,021 | 9/1982 | Morihisa et al. | 323/901 X |
| 4,845,419 | 7/1989 | Hacker | 323/303 X |
| 5,325,209 | 6/1994 | Manabe | 358/437 |
| 5,379,121 | 1/1995 | Yamada et al. | 358/400 |
| 5,446,905 | 8/1995 | Koshiishi | 358/412 X |
| 5,448,374 | 9/1995 | Yokoyama et al. | 358/400 |

*Primary Examiner*—Eric Frahm
*Attorney, Agent, or Firm*—Fitzpatrick, Cella, Harper & Scinto

[57] ABSTRACT

An image communication apparatus has a read unit for reading a document sheet image and a battery power supply. The read unit has a voltage conversion unit for converting power supplied directly from the battery power supply. Other units, such as a recording head and a motor drive unit, may also receive power directly from the battery. A modified thermal head design is used to provide response equal to that obtainable with a higher-voltage supply.

8 Claims, 4 Drawing Sheets

IMAGE COMMUNICATING APPARATUS WITH DIRECT SUPPLY OF POWER FROM A BATTERY TO VARIOUS UNITS

This application is a continuation of application Ser. No. 08/150,985 filed Nov. 12, 1993, which is now abandoned.

BACKGROUND OF THE INVENTION

1. Field of the Invention

The present invention relates to an image communication apparatus which uses a battery power supply.

2. Related Background Art

FIG. 1 shows a prior art facsimile apparatus.

In a prior art facsimile apparatus which uses a battery power supply 1-17, an output of the battery is supplied to a voltage converter/regulator 1-11 such as a DC—DC converter to suppress power supply fluctuation, and an output therefrom is supplied to a drive unit 1-14, a read unit 1-12 and a record unit 1-13.

However, in the facsimile apparatus in which the battery power supply is connected through the DC—DC converter, the configuration of the apparatus makes the apparatus large, and is not suitable for a compact apparatus, and it is also disadvantageous in terms of cost.

SUMMARY OF THE INVENTION

It is an object of the present invention to permit the direct connection of a battery power supply output to respective units.

DETAILED DESCRIPTION OF THE PREFERRED EMBODIMENTS

Figure 3:
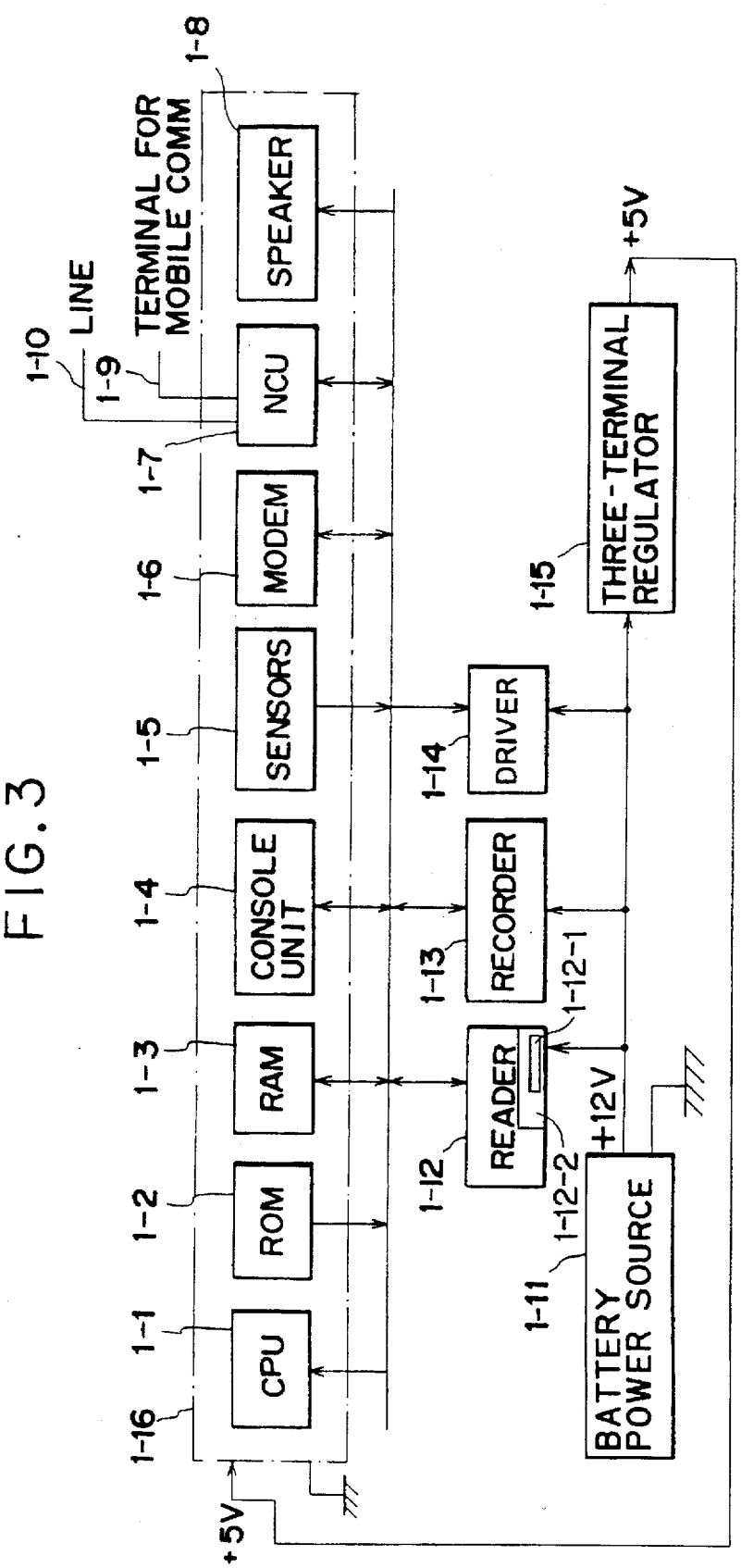
FIG. 3 is a block diagram of an embodiment of the present invention.

FIG. 3 shows a feature of the present invention, and is a block diagram of a main unit of the present invention.

A CPU 1-1 has a function to control an overall facsimile apparatus, that is, a RAM 1-3, a console unit 1-4, a read unit 1-12, a record unit 1-13, a drive unit 1-14, a modem 1-6, an NCU 1-7, a sensor unit 1-5 and a speaker unit 1-8 in accordance with a program stored in a ROM 1-2.

Those units are described below.

The RAM 1-3 stores binary data read by the read unit 1-12 and binary data to be recorded by the record unit 1-13, and stores binary data to be modulated by the modem 1-6 and outputted to a subscriber line 1-10 through the NUC 1-7. The RAM 103 is also used to store binary data demodulated from an input analog waveform received from the subscriber line 1-10 through the NCU 1-7 and the modem 1-6.

The console unit 1-4 comprises a start key for transmission and reception, a mode key for designating an operation mode (such as fine or standard) to be used in transmission of an image, a copy key for a copy mode and a stop key to stop the operation.

The CPU 1-1 detects the depression of those keys to control the respective units.

The sensor unit 1-5 comprises a record sheet width sensor, a record sheet presence/absence sensor, a document sheet width sensor and a document sheet presence/absence sensor, and detects the status of the document sheet and the record sheet under the control of the CPU 1-1.

The modem 1-6 comprises G3, G2, G1 and old FM modems and a clock generator connected to those modems, and modulates transmission data stored in the RAM 1-3 under the control of the CPU 1-1 and outputs it to the subscriber line 1-10 or a mobile communication terminal 1-9 through the NCU 1-7. The modem 1-6 also receives an analog signal from the subscriber line 1-10 or the mobile communication terminal 1-9 through the NCU 1-7, demodulates it and stores the binary data into the RAM 1-3.

The NCU 1-7 comprises a DC capture circuit and a 2–4 line conversion circuit, and connects the subscriber line 1-10 to the modem 1-6. It also connects the mobile communication terminal 1-9 to the modem 1-6.

The speaker unit 1-8 comprises a speaker driver and a speaker, and monitors the lines of the mobile communication terminal 1-9 and line 1-10, under the control of the CPU 1-1.

The mobile communication terminal 1-9 is a line terminal for the mobile communication connected to the NCU 1-7.

The line 1-10 is the subscriber line connected to the NCU 1-7.

The battery power supply 1-11 comprises a nickel-cadmium cell and directly supplies DC power at +12 volts to the read unit 1-12, the record unit 1-13 and the drive unit 1-14.

The read unit 1-12 comprises a DMA controller, a contact type image sensor (CS) 1-12-2, a TTL IC and a binary circuit, and binarizes data read by a CCD or CS 1-12-2 under the control of the CPU 1-1 and sequentially sends the binary data to the RAM 1-3. A three-terminal regulator 1-12-1 is built in the contact type image sensor (CS), and converts the DC +12 volts of the battery power supply to DC +10 volts for use as power by the sensor and the LED, so that they are not affected by the fluctuation of the battery power supply voltage.

The record unit 1-13 comprises a DMA controller, a thermal head for B4/A4 size sheet and a TTL IC, and reads out the record data (data to be recorded) stored in the RAM 1-3 under the control of the CPU 1-1 and prints it out as a hard copy.

The thermal head is a heat storage type energy thermal head having a thick undergraze (see blow) and operates at DC +12 volts received from the battery power supply to reduce the effect of the fluctuation of the power supply voltage.

Figure 2:
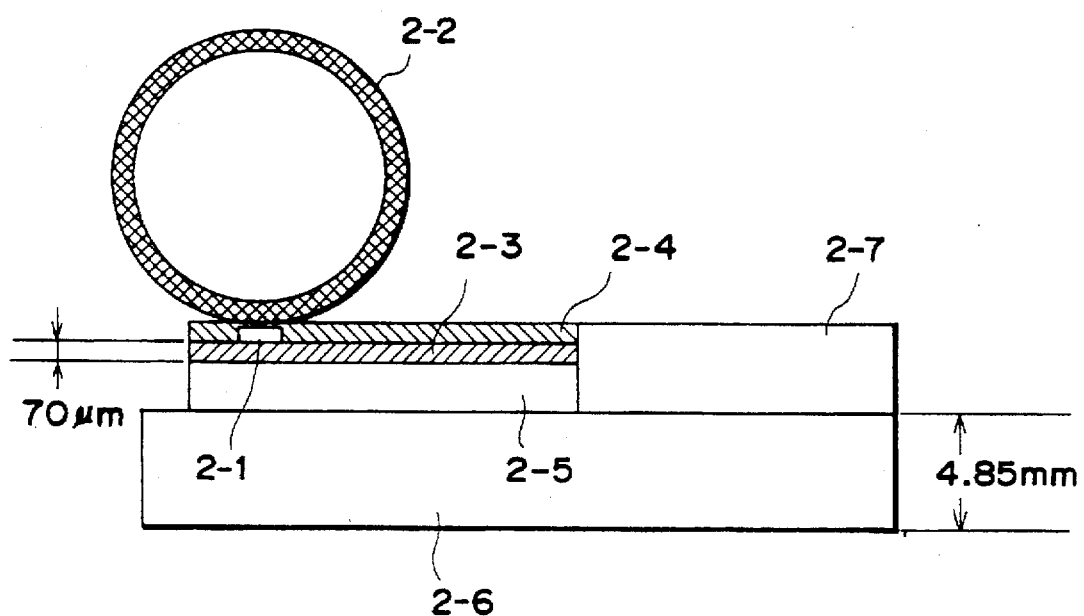
FIG. 2 is a sectional view of a record unit of the prior art apparatus.

A sectional view of the thermal head is shown in FIG. 2.

Figure 1:
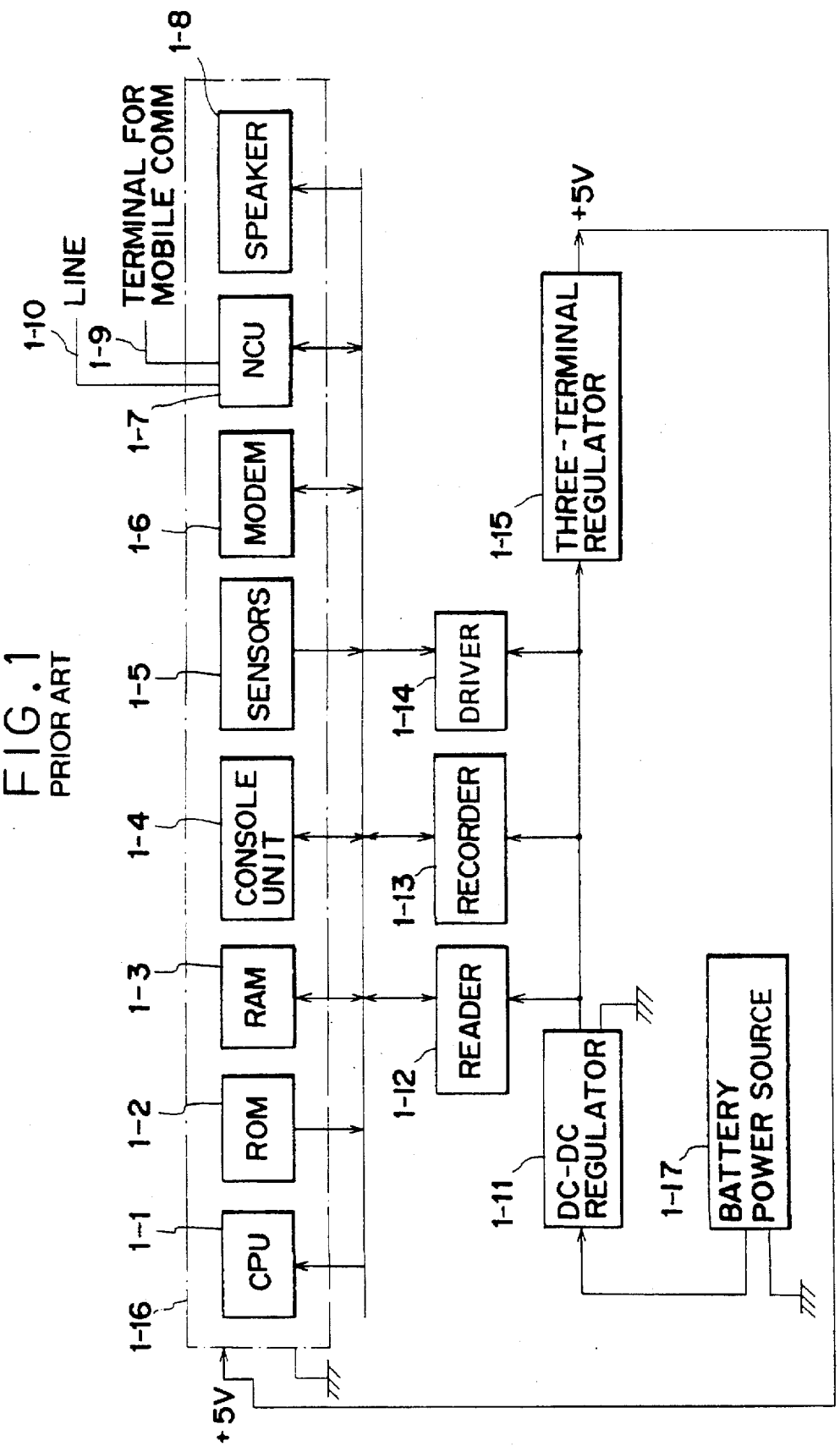
FIG. 1 is a block diagram of a prior art apparatus.
Figure 4:
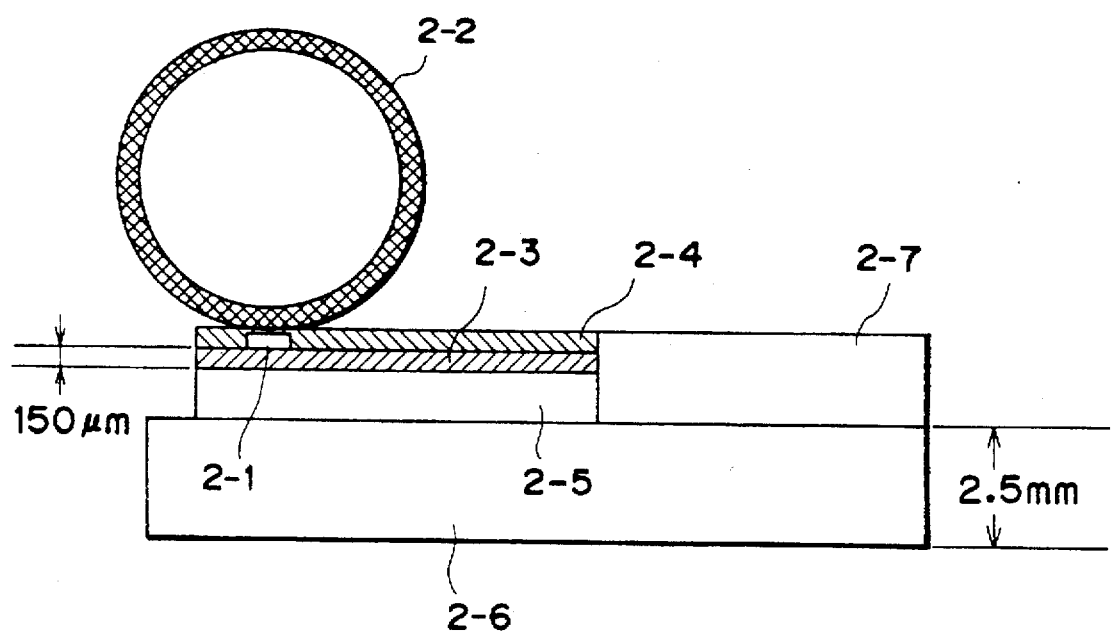
FIG. 4 is a sectional view of a record unit of the embodiment of FIG. 3.

As shown in FIG. 2, the recording head has a heat generating element 2-1 disposed on an undergraze 2-3. Energy is supplied to the heat generating element to record on a thermal sheet. Usually, a voltage of 24 volts is supplied to produce an instant rise of temperature in the heat generating element. The 24 volts power is usually supplied by using a regulated power supply such as a DC—DC converter (See FIG. 1). In order to make the power supply compact, in the present embodiment, however, the battery is directly used as the power supply, instead of a regulated power supply. Since the battery outputs 12 volts, the heat generating element of the recording head is naturally to be driven by 12 volts. In order to make the electrical energy applied to the heat generating element equal to that when 24 volts is applied, the current is doubled. However, since the heat generating element does not instantly heat up with the voltage of 12 volts, some heat escapes to the periphery, and high density printout is not attained. It has been found that a principal cause of the heat dissipation is that the heat generated by the heat generating element escapes to a ceramic substrate 2-5 and an aluminum substrate 2-6 via the undergraze 2-3. In order to prevent the heat dissipation from the undergraze, as shown in FIG. 4, the thickness of the undergraze is increased from 70 μm, as in the conventional structure, to 150 μm, to impart the heat storage effect to the undergraze. The thickness of the aluminum substrate is reduced from 4.85 mm, as in the conventional structure, to 2.5 mm, to reduce the heat sink effect. By the use of the heat storage type head, the instant rise-up in temperature is attained with the voltage of 12 volts, and the same record density as that of the prior art is attained. In FIGS. 2 and 4, numeral 2-2 denotes a TPH roller, numeral 2-4 denotes an overgraze and numeral 2-7 denotes a substrate.

In the present head, there is no substantial voltage drop in the head (a voltage difference between the heat generating element close to a voltage applying terminal and the other element). Accordingly, even if the applied voltage drops, say, from 12 volts to 11 volts due to fluctuation of the battery voltage, disappearance of a portion of image does not occur.

Thus, even if the record unit is directly driven by the battery power supply without using the regulated power supply, the image quality is not affected, and the power supply can be simplified.

The drive unit 1-14 comprises a stepping motor for driving feed and eject rollers of the read unit 1-12 and the record unit 1-13, a gear for transmitting a drive force of the motor and a drive circuit for controlling the motor.

The motor control is carried out using a constant current drive system to reduce the effect of any fluctuation in the battery power supply voltage.

The three-terminal regulator 1-15 converts the DC +12 volts from the battery power supply 1-11 to DC +5 volts and supplies it as power for the 5 volts unit 1-16.

Since the drive unit uses the constant current drive system, the record unit 1-13 uses the heat storage type thermal head and the read unit 1-12 uses the contact sensor with the built-in three-terminal regulator, the effect of fluctuation of the battery power supply voltage is reduced, and the battery power supply can be directly connected to the drive unit 1-14, the read unit 1-12 and the drive unit 1-14 without using a voltage converter/regulator such as the conventional DC—DC converter, and the size, weight and cost of the apparatus can be reduced.

What is claimed is:

1. An image reading apparatus comprising:
   reading means for reading a document sheet image, said reading means including an image sensor which has a three-terminal regulator; and
   a battery power supply which supplies power to said three-terminal regulator.

2. An image reading apparatus according to claim 1 further comprising transmission means for transmitting the image data read by said reading means.

3. An image reading apparatus according to claim 1, wherein said image reading apparatus is a facsimile apparatus.

4. An image reading apparatus according to claim 1, wherein the image sensor is a contact type image sensor.

5. An image reading apparatus according to claim 1, further comprising recording means for recording the image data read by said reading means.

6. An image reading apparatus according to claim 5, wherein said recording means includes a recording head having a heat generating element formed on a heat storage material.

7. An image reading apparatus according to claim 1, further comprising transport means for transporting document sheet to said reading means.

8. An image reading apparatus according to claim 7, wherein said transport means is driven by a constant current drive system.

\* \* \* \* \*

UNITED STATES PATENT AND TRADEMARK OFFICE
CERTIFICATE OF CORRECTION

PATENT NO. : 5,748,327

DATED : May 5, 1998

INVENTOR(S) : HISASHI TOYODA, ET AL.

It is certified that error appears in the above-identified patent and that said Letters Patent is hereby corrected as shown below:

COLUMN 2

Line 48, "undergraze (see blow)" should read --underglaze (see below)--; and
    Line 55, "undergraze 2-3." should read --underglaze 2-3.--.

COLUMN 3

Line 8, "undergraze 2-3." should read --underglaze 2-3.--;
    Line 9, "undergraze," should read --underglaze,--;
    Line 10, "undergraze" should read --underglaze--;
    Line 12, "undergraze." should read --underglaze.--; and
    Line 19, "overgraze" should read --overglaze--.

Signed and Sealed this

First Day of December, 1998

Attest:

BRUCE LEHMAN

*Attesting Officer*     *Commissioner of Patents and Trademarks*